Jan. 30, 1968 M. MILLER 3,366,745

REMOTE TELEPHONE EXTENSION SYSTEM

Original Filed Sept. 16, 1963 2 Sheets-Sheet 1

INVENTOR
Marvin Miller
BY Pennie, Edmonds,
Morton, Taylor and Adams
ATTORNEYS

REMOTE TELEPHONE EXTENSION SYSTEM

Original Filed Sept. 16, 1963 2 Sheets-Sheet 2

INVENTOR
Marvin Miller
BY Pennie, Edmonds,
Morton, Taylor and Adams
ATTORNEYS 3,366,745
REMOTE TELEPHONE EXTENSION SYSTEM
Marvin Miller, Fair Lawn, N.J., assignor to Sibany Corporation, Fair Lawn, N.J., a corporation of New Jersey
Continuation of application Ser. No. 309,145, Sept. 16, 1963, which is a continuation-in-part of application Ser. No. 225,231, Sept. 21, 1962. This application Apr. 4, 1967, Ser. No. 628,504
10 Claims. (Cl. 179—41)

The present invention relates generally to communication systems and more specifically to a telephone extension system including a wireless radio frequency link between a fixed station connected to a conventional telephone line and a portable radio receiving and transmitting device which enables a person carrying the portable radio device to answer and receive telephone calls by remote control. The present application is a continuation of application Ser. No. 309,145, filed Sept. 16, 1963, now abandoned, which in turn is a continuation-in-part of application Ser. No. 225,231, entitled, "Remote Telephone Extension System," filed Sept. 21, 1962, by Marvin Miller, also abandoned.

One of the troublesome shortcomings of present-day land-line telephone systems resides in the fact that use by subscribers is limited to the fixed installation points that are installed by the telephone company. As a consequence, extensive use is made of a plurality of wired telephone extensions within the subscriber's residence or business office.

Radio-telephone extension links have been proposed in the prior art which permit a subscriber to answer calls to a fixed telephone station at remote points. All of such systems that are presently known involve the use of relatively complex and bulky radio-receiving and transmitting control equipment. Quite aside from the problem of equipment complexity is the further problem that most of the proposed circuits have not functioned reliably. The lack of reliable operation of such equipment has been a source of annoyance not only to the subscriber but also to telephone company maintenance personnel.

It is a principal object of the present invention to provide an extremely simple but reliable radio-telephone extension device which will permit a subscriber to remotely receive and answer all telephone calls received at a fixed installation via an extremely compact portable radio transmitter and receiver unit.

In accordance with the present invention, the incoming signals (including the ringing signal) received on a wired telephone system are supplied to a fixed radio-frequency transmitter in the user's home or office and arranged to modulate the carrier of that transmitter. A portable receiver or transceiver tuned to the operating frequency of the home or office transmitter reproduces the ringing signal of an incoming call and alerts the subscriber that the call is being received on his telephone. The answering call spoken into the transmitter of the portable transceiver is picked up on a fixed receiver in the user's home or office that is tuned to the transmitting frequency of the portable transceiver and either the output audio signal of the A.G.C. signal in the receiver is utilized to actuate a plurality of control relay switches which are adapted to either electrically or mechanically "pick-up" the home telephone and effectively complete a resistive termination on the telephone wires so as to indicate to the calling telephone and the central switching system that the call circuit has been completed. At the same time, the audio frequency output signal from the home receiver is connected to the telephone line so that the answering call is transmitted to the calling party.

In accordance with one embodiment of the invention, relay switching circuits responsive to the R-F carrier signal from an answering transmitter or to the received answering voice signal are provided to electrically "pick-up" the telephone circuit and control circuits are provided for maintaining the telephone in the "picked-up" condition until such time as the calling party hangs up his telephone. Switching circuits responsive to the initial transient voltage produced by either the caller's hang-up pulse, the application of dial tone signal following the caller's hang-up, or the application of a warning signal after dial tone has been on for a period of time, are provided for automatically hanging up or disconnecting the remotely answered telephone. This featured circuitry of the present invention has been found to provide extremely reliable communication service, even throughout periods of transmission when the carrier signal of the remotely operated portable transceiver is lost due to adverse transmitting and receiving conditions.

The dial tone signal initial transient voltage which is used in a preferred embodiment of the invention to effect disconnection or "hang-up" of the remotely answered telephone is more fully described as follows. When a caller hangs up his telephone but the called party does not hang up his telephone, a dial tone soon appears on the called party's telephone. In some telephone systems the initiation of this dial tone is accompanied by a complete reversal of polarity of the D-C line voltage (e.g. 48 volts). In these instances, it is the transient voltage pulse which occurs during the voltage polarity reversal which is used to effect hang-up of the remotely answered phone. In other telephone systems, the polarity of the D-C voltage is not reversed, but a transient voltage pulse is produced at the initiation of the dial tone signal. In this case, it is the initial transient pulse which is used to effect hang-up of the remotely answered telephone.

As indicated above, the transient voltage pulse produced when the calling party hangs up his phone may also be utilized to effect hang-up of the remotely answered phone. In the alternative, a third transient pulse that accompanies the application of a warning signal to the line may be utilized in accordance with the invention to effect hang-up of the remotely answered phone.

A further advantage of the present invention resides in the fact that simplified control circuitry is utilized and the simplified circuitry makes it possible to make use of extremely compact portable equipment, particularly insofar as existing telephone signals are utilized to effect electrical "hang-up" of the remotely answered telephone receiver.

In accordance with a second embodiment of the invention, electromechanical means are provided for operating the switch buttons normally actuated by picking up the telephone receiver unit from its rest position. This embodiment of the invention which is controlled by circuits substantially the same as those generally described above has the advantage that no physical electrical connections to the telephone equipment are required. Pick-up of the ringing and incoming voice signals and transmission of outgoing signals may be provided by a conventional pick-up coil that is mounted adjacent to the induction coil in the answering telephone. In the alternative, incoming voice and ringing signals may be picked up by either a microphone or an inductive pickup mounted in close proximity to the telephone receiver and answering voice signals may be coupled to the line by a small loudspeaker mounted near the telephone mouthpiece. The control circuits are substantially the same as those provided in the first embodiment except that the electrical "pick-up" relay is arranged to energize a solenoid device provided to release the switch buttons normally held in depressed condition by the telephone receiver unit. This operation is provided in lieu of the effective electrical "pick-up" arrangement wherein a resistive termination is placed across the incoming telephone wires to indicate that the answering telephone is being electrically picked up. This latter embodiment of the invention is particularly useful in areas where telephone companies absolutely prohibit the attachment of any external electrical equipment to the company's leased telephone and telephone lines.

The foregoing and other objects, features and advantages of the invention will be apparent from the following more particular description of preferred embodiments of the invention, as illustrated in the accompanying drawings in which.

Figure 1:
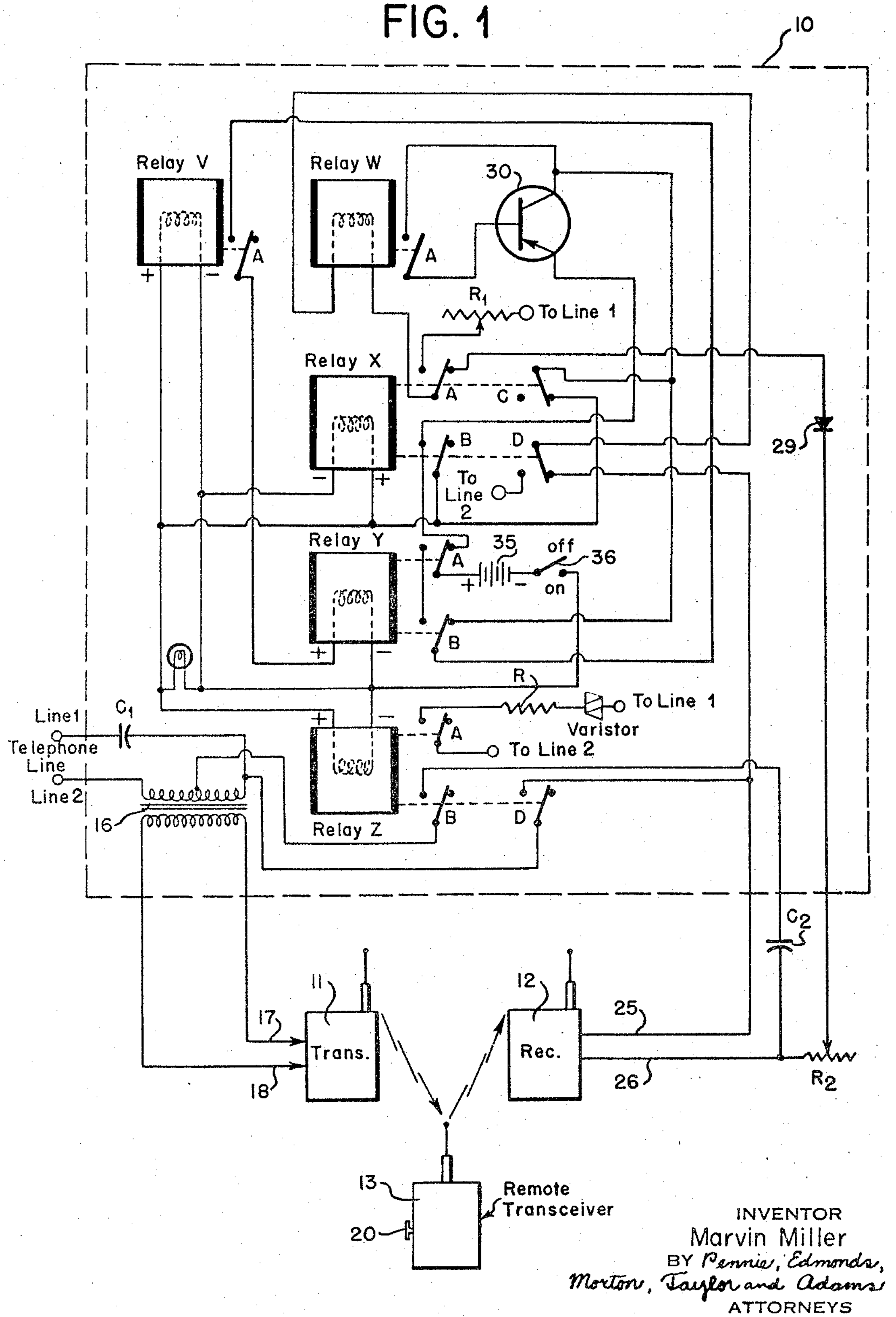
FIG. 1 is a combined block and schematic diagram of a portable remote answering telephone system in accordance with the present invention.

Referring now to FIG. 1, there is shown input terminals 1 and 2 which are provided for connection to the incoming telephone line. The portable extension telephone system provided by the present invention includes control circuit 10 (enclosed in dotted outline) which includes a plurality of relays that are connected to the telephone line as shown and located at a fixed position preferably adjacent to the telephone installation for which remote answering is desired. The system also includes radio-frequency transmitter 11 and radio-frequency receiver 12, both of which may be conveniently located in a fixed position adjacent to the incoming telephone line terminals. Portable transceiver 13, which is preferably a transistorized pocket-size unit, is provided for receiving the incoming ringing and voice signals at remote points and for transmitting the answering response. Operation of the entire system including the several switching relays at 10 will now be described in further detail.

In normal operation, 11 and 12 are electrically energized and transceiver unit 13 carried by the subscriber is turned on so that the receiver is capable of receiving all signals transmitted by 11. The radio-frequency units 11, 12 and 13 are conventional and may operate, for example, in the citizen's band using either AM or FM intelligence modulation techniques. Incoming ringing and voice signals are supplied from the telephone line to terminals 1 and 2 through blocking capacitor C1 and coupling transformer 16 to the audio modulation input terminals 17 and 18 of transmitter 11. Transmitter 11 is preferably of the voice-operated type wherein the radio-frequency carrier is only generated in response to incoming ringing or voice signals. Since such voice-operated transmitter circuits are well known in the art and since they form no part of this invention, circuit details will not be described herein.

The transmitted ringing signal is received on unit 13, the receiving portion of which is tuned to the operating frequency of transmitter 11. Unit 13 may comprise separate receiver and transmitter units wherein the receiver would operate continuously. In either case the operating frequency of the transmitter associated with 13 should preferably be different from the transmitting frequency of 11 so that receiver 12 can operate continuously to receive signals from 13 without interference from the signals transmitted by 11. As indicated above, where compactness and portability is of prime concern, 13 may preferably be a transceiver. In the transceiver operation, the portable receiver is disabled and the transmitter is turned on by depressing the push-to-talk button 20. The answering call is then transmitted by unit 13 and received by 12, the audio voice signals being delivered by 12 to leads 25 and 26 via the normally closed D switch contacts of relay X to one terminal of the operating coil for relay W, and through rheostat R2 diode 29 and the normally closed A contacts of relay X to the other side of the operating coil for relay W. Relay W is a sensitive relay switch which may be, for example, of the well-known meter type requiring very small amounts of electrical current to actuate and close the single pole switch contacts A. Diode 29 is provided in series with line 26 to rectify the voice signals delivered from the receiver and thereby provide a polarized D-C current to the operating coil for relay W. Rheostat R2 is provided to afford an adjustable sensitivity control for relay W and is ordinarily adjusted to reduce the sensitivity of relay W to the point that noise impulses (e.g., static) produced at the output of receiver 12 will not actuate relay W. Operation of relay W by the answering voice signal, in response to reception of the ringing signal at transceiver 13, closes the normally open A switch contacts of relay W connecting the base and collector of transistor 30 causing that transistor to conduct current between the emitter and collector and thereby energize the operating coils of relays X and Z.

By adjusting R2 to provide slightly increased sensitivity, the operation of relay W may be carrier controlled by the signal voltage produced when the carrier signal is turned on at 13.

Battery power is supplied to transistor 30 from battery 35 when switch 36 is thrown to the "on" or operate position. The plus terminal of battery 35 is connected via the normally closed A contacts of relay Y to the emitter of transistor 30. The negative terminal of battery 35 is returned through switch 36 to the respective negative terminals of the coils for relays V, X, Y and Z as shown. The positive terminal of battery 35 is connected through 30 to the positive terminals of the relay coils for V, X and Z, as shown, via the normally closed C contacts of relay X. With the operation of relay X, contact C is switched to an open position and contact B is switched from a normally open position to a closed position. The plus terminal of battery 35 is thereby directly connected to the plus terminals of the operating coils for relays V, X and Z. Thus the switch contact B for relay X functions as a latching or holding contact for these three relays. At the same time, the opening of contacts C for relay X disconnects the collector circuit of transistor 30 from the plus terminals of relays V, X and Z.

Operation of relay Z connects the audio output signal on output lines 25 and 26 across a portion of the primary winding of transformer 16, as shown, via relay switch contacts B and D. Thus the voice signal transmitted by 13 and received by 12 is connected to the telephone line and heard on the telephone receiver by the person placing the call. At the same time, switch contacts A of relay Z connect resistor R in series with a varistor across terminals 1 and 2 of the incoming telephone line. This latter switching operation places a resistive termination across terminals 1 and 2 and effectively functions to electrically "pick-up" the local telephone receiver. The resistive termination across the line halts the ringing signal generator at the central telephone office and completes the interconnection of the caller's telephone with that of the telephone that is called. The varistor functions in a conventional manner to automatically compensate for variations in voice signal level due to changes in operating line length.

The operation of relay X also causes the operating coil for sensitive relay W to be transferred from the audio output line of receiver 12 as described above to the incoming telephone line (e.g., terminals 1 and 2). This transfer operation is effected by switch contacts A and D of relay X. Rheostat R1, which is connected in series between line 1 and switch A, serves as a relay sensitivity control which is adjusted to prevent operation of the sensitive relay W by the normal D-C voltage appearing on the telephone line (e.g., 48 volts D-C).

In the transferred operating position, sensitive relay W functions to detect the transient voltage that accompanies either hang-up of the caller's phone, initiation of the dial tone signal which is applied to the telephone line at the central telephone office shortly after the calling telephone is hung up or application of the warning signal. With proper adjustment of R1, relay W is actuated by any one of the foregoing transient signals but is not actuated by the smaller voice signals that are transmitted via lines 1 and 2. Thus it will be seen that relay W functions, as described above, to electrically sense the answering voice signals and electrically "pick-up" the local telephone in response to an incoming call, and following completion of the call relay W functions to sense a standard transient voltage produced across lines 1 and 2 and electrically "hang-up" the telephone receiver.

The operation of relay W to effect "hang-up" of the receiver will now be described in greater detail. It will be recalled from the description appearing above that contacts B of relay X provide a holding voltage to latch in relays V, X and Z. Relay V, however, is a time delay relay which preferably does not close for approximately two seconds following application of voltage to the operating coil. Closure of relay V, following the two second time delay, connects the plus terminal of the operating coil for relay Y to the collector of transistor 30 via normally closed contacts B of relay Y. When relay W is actuated in response to a voltage transient across lines 1 and 2 of the incoming telephone line (e.g., dial tone transient), transistor 30 is once more biased to the conducting state by the closure of contacts A on relay W, and relay Y is operated by the flow of current between the emitter and collector of transistor 30. The operation of contacts A and B of relay Y breaks the battery supply to the B holding contacts for relay X thereby causing relays X and Z to drop out. At the same time the operation of contacts A and B of relay Y disconnects the transistor emitter-collector circuit from the operating coil of relay Y and connects the plus terminal of battery 35 directly to the plus terminal of the operating coil for relay Y via the A contacts of relay V.

With the dropout of relay Z, the audio output lines from receiver 12 are disconnected from the telephone line and the resistive termination is removed from across the line. Thus it will be given that the dropout operation of relays X and Z by the actuation of relay Y in response to closure of relay W effects an electrical "hang-up" of the telephone without any operation of control circuits by the remote transceiver 13. Relay Y is de-energized following the normal two second delay in the dropout of relay V. The control circuits are then in condition to receive another call.

Although the time delay relay V may in certain circumstances be omitted from the control circuit shown in the drawing, it is preferably included to prevent inadvertent triggering of sensitive relay W by the electrical switching transients produced by the operation of relays X and Z. The time delay in the initial operation of relay V precludes premature "hang-up" of the telephone circuit by the operation of relay Y in response to spurious switching transients, etc., on the telephone line, and the delay in dropout of relay V precludes the inadvertent and unwanted pick-up of the telephone circuit (e.g., following a telephone conversation) by switching transients produced with the release of relays X and Z.

Figure 2:
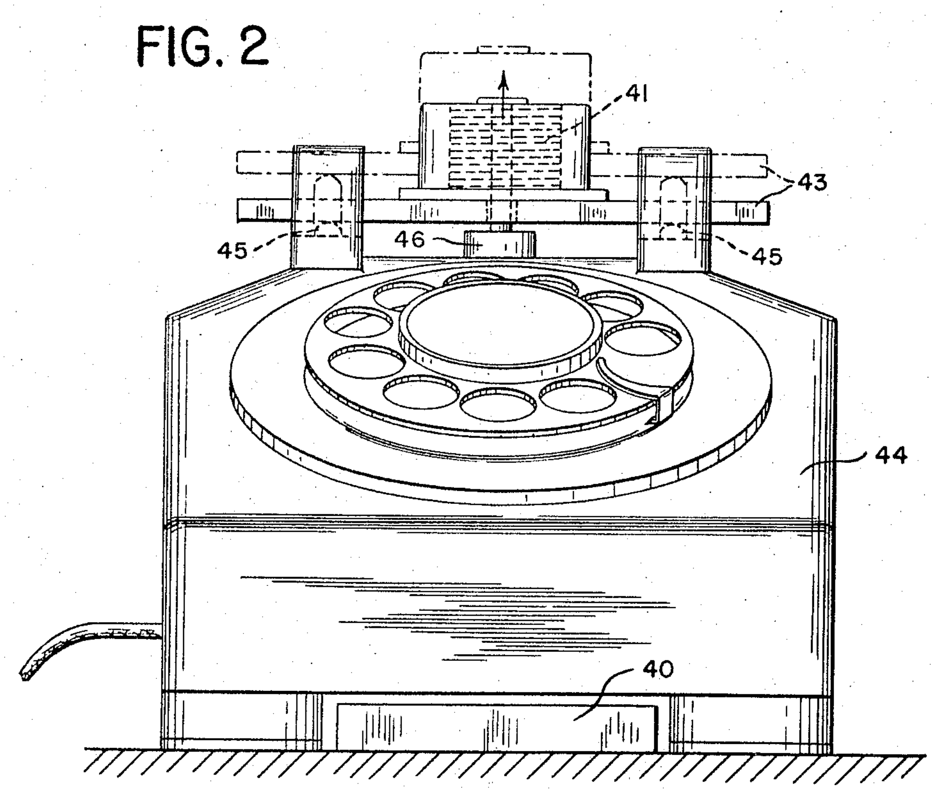
FIG. 2 is an elevation view of a telephone with a remotely controlled electromechanical pick-up device as provided by the present invention.
Figure 3:
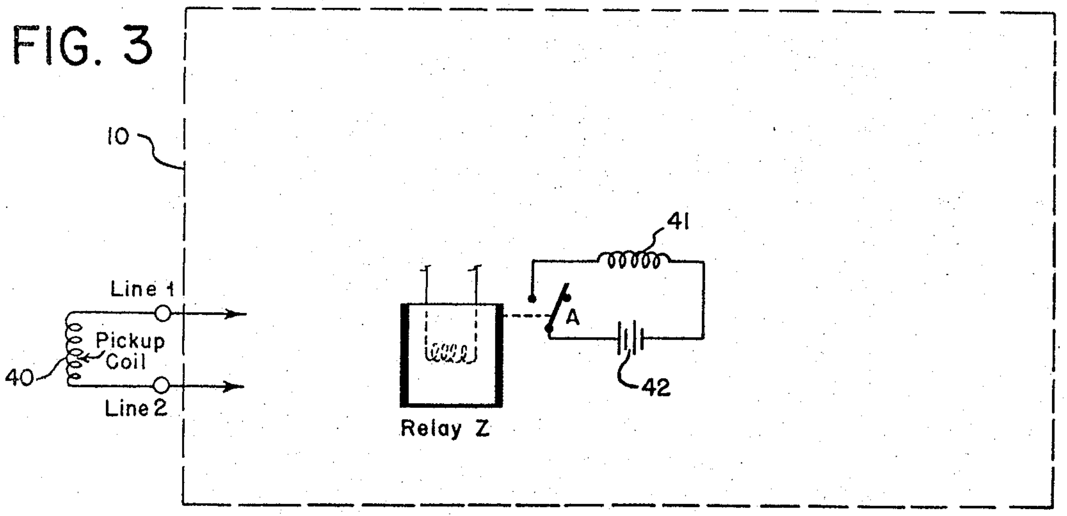
FIG. 3 is a fragmentary schematic diagram illustrating a portion of the control circuits provided to operate the apparatus in FIG. 2.

In the second embodiment of the invention illustrated in FIGS. 2 and 3, the control circuit 10 is modified in several respects so that physical electrical circuit connections to the incoming telephone lines are completely avoided. An induction pick-up coil 40, preferably mounted adjacent the induction coil in the telephone, is provided to pick up incoming ringing and voice signals and transmit outgoing voice signals from the remotely located transceiver 13. Thus signal transmission to and from the telephone is effected without any physical electrical contacts being made to the incoming telephone equipment.

As indicated above, signal coupling to the telephone may be effected by well known speaker to microphone and headphone to microphone acoustic coupling arrangements.

In this embodiment of the invention, physical pick-up of the subscriber's telephone is effected by electrical energization of solenoid 41 as shown in FIGS. 2 and 3. Contacts A for relay Z are arranged to energize 41 with battery 42 when relay Z is activated. The remaining circuitry in 10 is unchanged from that shown in FIG. 1 and functions as described above.

Solenoid 41 is mechanically mounted on a dummy headpiece 43 as shown in FIG. 2. The normal telephone receiver is removed from its resting cradle of telephone 44 and member 43 is mounted on the phone for which remote answering service is desired. The total weight of 41 and 43 is sufficient to depress the telephone switch-buttons 45 in the same manner as the normal receiver unit does when it is in its normal resting position. When solenoid 41 is electrically energized in response to an answering voice signal from the remote transceiver 13, the movable solenoid armature 46 is extended causing the entire member 43 to be elevated sufficiently (as shown in doted outline) to release switch buttons 45. In this manner, the phone is effectively remotely picked up in response to an incoming call by control circuits which are in no way physically connected to the electrical circuits of the incoming telephone line or telephone equipment.

As described above, relay Z is de-energized in response to the incoming transient signal (e.g., dial tone) applied to the telephone lines when the calling telephone is hung up. The opening of contacts A with the drop out of relay Z disconnects solenoid 41 from battery 42 causing the dummy member 43 to depress buttons 45 and effectively hang up the telephone. In all other respects, the operation of the second embodiment of the invention illustrated in FIGS. 2 and 3 is the same as that described for FIG. 1.

Thus it will be seen that applicant's invention provides an extremely simple and reliable remote answering telephone system with a minimum of operating components, both at the telephone site and in the remote portable radio transmitter and receiving devices.

While the invention has been particularly shown and described with reference to preferred embodiments thereof, it will be understood by those skilled in the art that various changes in form and details may be made therein without departing from the spirit and scope of the invention; in particular, where radio is used in the description, it is understood that any electromagnetic, electric, or magnetic field system of carrier frequency transmission can be used.

I claim:

1. Apparatus adapted to pick up the incoming ringing, voice and dial-tone signals to a called telephone and to transmit to the calling telephone the answering voice signal from a remotely located portable radio-frequency answering station, said apparatus comprising;

a portable radio-frequency answering station including a first receiver and a first transmitter, a fixed radio-frequency station associated with said telephone including a second transmitter provided to transmit said incoming ringing and voice signals for reception by said first receiver, and a second receiver for receiving and supplying to an output line the answering voice signals transmitted by said first transmitter, first circuit means responsive to the answering voice signal from said second receiver provided to operatively place a resistive termination across the called telephone line and to electrically couple said output line thereto.

and second circuit means, operatively responsive to the transient resulting from the application of a dial-tone signal to the called telephone line for removing the resistive termination therefrom and for uncoupling from said line the output line for supplying the answering voice signals from said second receiver.

2. Apparatus adapted to electrically terminate with a line holding resistance the line of a called telephone in response to an answering electrical voice signal and to automatically disconnect said resistance from the line following the hang up of a calling telephone, said apparatus comprising;

first circuit means operatively responsive to said answering electrical voice signal provided to place a resistive termination across the called telephone line and to electrically couple thereto an output line supplying an answering voice signal, and second circuit means operatively responsive to the transient resulting from the application of a dial-tone signal to the called telephone line provided to remove the resistive termination from said line and to uncouple therefrom the output line for supplying the answering voice signal.

3. Apparatus adapted to electrically connect a called telephone to a calling line in response to an answering electrical voice signal and to automatically disconnect said called telephone following the hang up of a calling telephone, said apparatus comprising;

an electromechanical dummy receiver adapted to be mounted on a telephone cradle support in place of the normal telephone headpiece, said dummy receiver including electrically energizable solenoid means mounted thereon for lifting said dummy receiver from said cradle, first circuit means operatively responsive to said answering electrical voice signal provided to electrically energize said solenoid means and to electrically couple an output line for supplying the answering voice signal to said called telephone line, and second circuit means operatively responsive to the transient resulting from the application of a dial-tone signal to the called telephone line provided to electrically de-energize said solenoid and to uncouple from said line the answering signal output line.

4. Apapratus adapted to pick up the incoming ringing, voice and dial-tone signals to a called telephone and to transmit to the calling telephone the answering voice signal from a remotely located portable radio-frequency answering station, said apparatus comprising:

a portable radio-frequency answering station including a first receiver and a first transmitter, a fixed radio-frequency station associated with said telephone including a second transmitter provided to transmit said incoming ringing and voice signals for reception by said first receiver, and a second receiver for receiving and supplying to an output line the answering voice signals transmitted by said first transmitter, an electromechanical dummy receiver adapted to be mounted on a telephone cradle support in place of the normal telephone headpiece, said dummy receiver including electrically energizeable solenoid means mounted thereon for lifting said dummy receiver from said cradle, first circuit means operatively responsively to the answering voice signal from said second receiver provided to electrically energize said solenoid means and to electrically couple the output line supplying the answering voice signal from said second receiver to said called telephone line, and second circuit means operatively responsive to the transient resulting from the application of a dial-tone signal to the called telephone line provided to electrically de-energize said solenoid and to uncouple from said line the answering signal output line.

5. Apparatus adapted to pick up the incoming ringing, voice and dial-tone signals to a called telephone and to transmit to the calling telephone the answering voice signal from a remotely located portable radio-frequency answering station, said apparatus comprising:

a portable radio-frequency answering station including a first receiver and a first transmitter, a fixed radio-frequency station associated with said telephone including a second transmitter provided to transmit said incoming ringing and voice signals for reception by said first receiver, and a second receiver for receiving and supplying to an output line the answering voice signals transmitted by said first transmitter, a first electrically energizeable relay switch having switch contacts provided to connect a resistive termination across said line and to connect the answering audio signal output line from said second receiver to said line, a second relay switch having switch contacts provided to electrically energize said first relay in response to an answering audio signal from said second receiver, a third relay switch having normally closed contacts connected in series with the switch contacts of said second relay and the coil circuit for said first relay switch, and circuit means operatively responsive to the transient resulting from the application of a dial-tone signal to said line, said circuit means including switch means operatively arranged to electrically energize said third relay switch, whereby said first relay switch is de-energized and the resistive termination and answering audio signal output line are automatically removed from said telephone line.

6. Apparatus adapted to be connected to a conventional dial telephone system to automatically electrically terminate with a line holding resistance the line of a called telephone in response to an answering electrical voice signal supplied on an output line and to automatically disconnect said called telephone following the hang up of a calling telephone, said apparatus comprising:

first relay switch means operatively responsive to said answering electrical voice signal provided to electrically connect a resistive termination across the called telephone line and to electrically connect thereto the answering voice signal output line, and second relay switch means operatively responsive to the transient resulting from the application of a dial-tone signal to the called telephone provided to electrically disconnect the resistive termination from said line and to electrically disconnect therefrom the answering voice signal output line.

7. Apparatus adapted to pick up the incoming ringing, voice and dial-tone signals to a called telephone and to transmit to the calling telephone the answering voice signal from a remotely located portable carrier-frequency answering station, said apparatus comprising:

a portable carrier-frequency answering station including a first receiver and a first transmitter, a fixed carrier-frequency station associated with said telephone including a second transmitter provided to transmit said incoming ringing and voice signals for reception by said first receiver, and a second receiver for receiving and supplying to an output line the answering voice signals transmitted by said first carrier transmitter, first circuit means responsive to the detected carrier signal from said second receiver provided to operatively place a resistive termination across the called telephone line and to electrically couple said output line voice signals thereto, and second circuit means operatively responsive to the application of a transient signal voltage to the called telephone line following the hang up of the calling telephone, said circuit means being adapted to remove said resistive termination from said line and to uncouple from said line the output line for supplying answering voice signals from said second receiver.

8. Apparatus in accordance with claim 7 characterized in that said transient signal voltage comprises a signal accompanying the initiation of the dial-tone.

9. Apparatus in accordance with claim 7 characterized in that said transient signal voltage comprises a voltage pulse produced across the telephone line accompanying the hang up of the calling telephone.

10. Apparatus in accordance with claim 7 characterized in that said transient voltage comprises a signal accompanying the initiation of a warning signal applied to the telephone line following the application of a dial-tone signal.

References Cited

UNITED STATES PATENTS

| | | | |
|---|---|---|---|
| 2,844,659 | 7/1958 | Shaw | 179—81 |
| 2,912,504 | 11/1959 | Dagnall et al. | 179—6 |

WILLIAM C. COOPER, *Primary Examiner.*